United States Patent
Shimizu et al.

(10) Patent No.: US 8,657,432 B2
(45) Date of Patent: Feb. 25, 2014

(54) INK COMPOSITION AND TEXTILE PRINTING METHOD USING THE SAME

(75) Inventors: Shinsuke Shimizu, Tokyo (JP); Mariko Umeda, Tokyo (JP); Yoshiki Akatani, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 216 days.

(21) Appl. No.: 12/865,106

(22) PCT Filed: Feb. 16, 2009

(86) PCT No.: PCT/JP2009/052528
§ 371 (c)(1),
(2), (4) Date: Jul. 28, 2010

(87) PCT Pub. No.: WO2009/104547
PCT Pub. Date: Aug. 27, 2009

(65) Prior Publication Data
US 2011/0007110 A1    Jan. 13, 2011

(30) Foreign Application Priority Data
Feb. 22, 2008    (JP) .................................. 2008-040887

(51) Int. Cl.
*B41J 2/01*    (2006.01)

(52) U.S. Cl.
USPC .......................... 347/100; 347/95; 106/31.27

(58) Field of Classification Search
USPC ................ 347/100, 95, 96, 101, 102, 88, 99; 106/31.27, 31.13; 523/160, 161
See application file for complete search history.

(56) References Cited

U.S. PATENT DOCUMENTS

| | | | | |
|---|---|---|---|---|
| 6,001,137 A | * | 12/1999 | Alfekri et al. | 8/445 |
| 6,015,454 A | * | 1/2000 | Lacroix et al. | 106/31.47 |
| 2003/0199611 A1 | * | 10/2003 | Chandrasekaran et al. | 523/160 |
| 2008/0092309 A1 | * | 4/2008 | Ellis et al. | 8/478 |
| 2010/0092672 A1 | * | 4/2010 | Kawakami et al. | 427/256 |

FOREIGN PATENT DOCUMENTS

| | | | | |
|---|---|---|---|---|
| JP | 04036362 A | * | 2/1992 | ............ C01D 11/16 |
| JP | H04-036362 A | | 2/1992 | |
| JP | H05-246132 | | 9/1993 | |
| JP | 2001-146561 | | 5/2001 | |
| JP | 2002-241639 A | | 8/2002 | |
| JP | 2003-306627 | | 10/2003 | |
| JP | 2003306627 A | * | 10/2003 | ................ B41J 2/01 |
| JP | 2004-155869 A | | 6/2004 | |
| JP | 2004-346134 A | | 12/2004 | |
| JP | 2005-520015 | | 7/2005 | |
| JP | 2007-238892 A | | 9/2007 | |
| JP | 2008-231341 A | | 10/2008 | |
| WO | WO 03/076532 A1 | | 9/2003 | |

OTHER PUBLICATIONS

International Search Report issued in corresponding PCT Application No. PCT/JP2009/052528, mailed Mar. 10, 2009.

* cited by examiner

*Primary Examiner* — Manish S Shah
(74) *Attorney, Agent, or Firm* — Knobbe Martens Olson & Bear LLP

(57) ABSTRACT

Disclosed is a reactive dye ink exhibiting excellent ejection stability when used in a printer having an inkjet head for commercial use which requires a high-viscosity ink. The reactive dye ink has excellent storage stability and excellent fixability to textiles. Specifically disclosed is an ink composition containing at least one reactive dye serving as a coloring matter, which also contains water and a compound represented by formula (1) and having an average molecular weight of 340-2,200. (1)

$$H \left[ O - \underset{H}{\overset{X_1}{\underset{|}{C}}} - \overset{H_2}{C} \right]_k O - \overset{H_2}{C} - \underset{\underset{\underset{H}{\overset{|}{O}}}{\overset{|}{CH_2}}}{\overset{H}{\underset{|}{C}}} - \overset{H_2}{C} - O - \overset{H_2}{C} - \underset{\underset{\underset{H}{\overset{|}{O}}}{\overset{|}{CH_2}}}{\overset{H}{\underset{|}{C}}} - \overset{H_2}{C} - O \left[ \overset{H_2}{C} - \underset{H}{\overset{X_4}{\underset{|}{C}}} - O \right]_n H$$

[In the formula, $X_1$, $X_2$, $X_3$ and $X_4$ independently represent a hydrogen atom or a methyl group; and the sum of j, k, m and n is a number not less than 4 but not more than 40.]

10 Claims, No Drawings

INK COMPOSITION AND TEXTILE PRINTING METHOD USING THE SAME

This application is the U.S. National Phase under 35 U.S.C. §371 of International Application PCT/JP2009/052528, filed Feb. 16, 2009, designating the U.S., and published in Japanese as WO2009/104547 on Aug. 27, 2009, which claims priority to Japanese Patent Application No. 2008-040887, filed Feb. 22, 2008.

TECHNICAL FIELD

The present invention relates to an ink composition containing a reactive dye as a coloring matter, and a textile printing method of a cellulosic textile using the same. More specifically, the present invention relates to an ink composition for ink jet textile printing that is superior in coloring properties and reproducibility by processing, and a textile printing method of a cellulosic textile using the same. In particular, the present invention relates to an ink composition suited for a printer equipped with an ink jet head for industrial use, and a textile printing method of a cellulosic textile using the same.

BACKGROUND ART

Ink jet textile printing of textile materials carried out using an ink jet printer is advantageous as compared with screen textile printing, roller textile printing and rotary textile printing in many aspects in that: a plate making step is not required thereby enabling simplification of steps; a digitalized design can be printed as it is via a computer; various types of products can be produced even in small quantities; the amount of waste liquids of color paste and the like can be significantly reduced; and the like. On the other hand, ink jet textile printing involves a problem of low print processing speed, and difficulty in expressing deep colors, and the like as compared with conventional plate-making textile printing. Therefore, ink jet textile printing has been predominantly used for producing sample textiles, and for small-scale production.

In recent years, ink jet textile printing has been increasingly popular as a result of significant improvement in printing speed of ink jet printers due to technical progress of image processing by means of a computer, and print head manufacturing, also with demands on market for digitalization of print designs, and on diversification and lot reduction in print processing.

As dye inks for ink jet textile printing, acidic dye inks for polyamide fibers such as silk and nylon; dispersion dye inks for polyester fibers; reactive dye inks for cellulosic fibers such as cotton and rayon; and the like have been commercially available. These dye inks for ink jet textile printing are generally aqueous inks prepared by dissolving or dispersing a dye in water. Furthermore, a compound, for example, a kind of glycol such as ethylene glycol, diethylene glycol, propylene glycol or triethylene glycol, or a monoalkyl ether of these glycols, or a solvent having a hydroxy group in the molecule such as glycerin, or the like is added to the ink for the purpose of suppressing drying of the ink owing to evaporation of the moisture, and adjusting the viscosity of the ink. However, the reactive dye fixes to the textile via a reaction of reactive groups that are present in the dye molecules with hydroxy groups that are present in the textile. Thus, when the aforementioned solvent or the like is added to an ink containing a reactive dye, hydroxy groups included in the solvent or the like react with the reactive dye during the storage of the ink, as well as in the reaction and fixation step carried out by heating for the purpose of fixing the dye after the textile printing, whereby a problem of lowered fixation ratio of the dye to the textile may occur. Therefore, the solvent or the like added into the reactive dye ink must be selected from among those that exhibit a low reactivity with the reactive dye, and thus such solvents and the like have been proposed. Specific examples of such a solvent which have been conventionally known include thiodiglycol (Patent Document 1), propylene glycol (Patent Document 2), 1,3-butanediol (Patent Document 3), EO adducts of glycerin (Patent Document 4), polypropylene glycol (Patent Document 5), and the like.

Patent Document 1: Japanese Unexamined Patent Application Publication No. H05-246132 (example 1)
Patent Document 2 Japanese Unexamined Patent Application Publication No. 2002-241639 (example 3)
Patent Document 3: Japanese Unexamined Patent Application Publication No. 2003-306627 (example 2)
Patent Document 4: Japanese Unexamined Patent Application Publication No. 2001-146561
Japanese Unexamined Patent Application (Translation of PCT Application), Publication No. 2005-520015

DISCLOSURE OF THE INVENTION

Problems to be Solved by the Invention

In the mean time, as disclosed in Patent Document 5, highly durable ink jet heads for industrial use, and high-speed printers equipped with such an ink jet head have been developed in recent years, in which a viscosity as high as 8 to 20 mPa·s is required as a physical property of the ink for securing the discharge stability. However, in the case of an ink prepared using a solvent which is added to conventionally known reactive dye inks, discharge stability in printers equipped with an ink jet head for industrial use which requires a highly viscous ink, stability of the reactive dye in the ink, and fixation properties to textiles can be problematic. Therefore, development of a reactive dye ink for use in these printers is needed that is superior in discharge stability, and in storage stability and fixation properties on the textile of the ink.

Means for Solving the Problems

The present inventors thoroughly investigated in order to solve the problems described above, and consequently found that the foregoing problems are solved by an ink composition containing at least one reactive dye as a coloring matter, and also containing water and a specific compound represented by the following formula (1). Thus, the present invention was completed.

Accordingly, a first aspect of the present invention provides an ink composition containing: at least one reactive dye as a coloring matter; water; and a compound represented by the following formula (1), having an average molecular weight of 340 to 2,200,

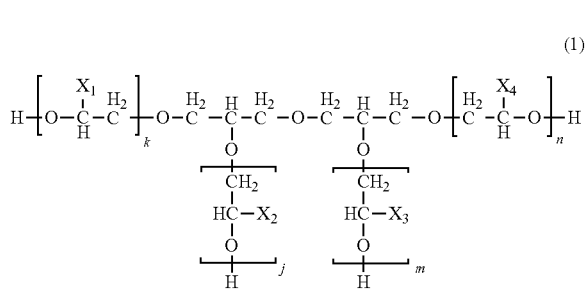

wherein, $X_1$, $X_2$, $X_3$, and $X_4$ each independently represent a hydrogen atom or a methyl group; and j, k, m and n each represent a numeral, the sum of which is no less than 4 and no greater than 40.

A second aspect of the invention provides the ink composition according to the first aspect, in which $X_1$, $X_2$, $X_3$, and $X_4$ in the above formula (1) all represent a hydrogen atom or a methyl group.

A third aspect of the invention provides the ink composition according to the first aspect, in which $X_1$, $X_2$, $X_3$, and $X_4$ in the above formula (1) all represent a methyl group.

A fourth aspect of the invention provides the ink composition according to the first aspect, further containing a water soluble organic solvent.

A fifth aspect of the invention provides the ink composition according to the first aspect, further containing a pH adjusting agent in an amount of 0.1 to 2% by mass relative to the total mass of the ink composition.

A sixth aspect of the invention provides the ink composition according to the fifth aspect, in which the pH adjusting agent is tris(hydroxymethyl)aminomethane.

A seventh aspect of the invention provides the ink composition according to the first aspect, in which the reactive dye is a monochlorotriazine based reactive dye.

An eighth aspect of the invention provides the ink composition according to the first aspect, in which the viscosity of the ink composition at 25° C. falls within the range of 3 to 20 mPa·s.

A ninth aspect of the invention provides the ink composition according to the eighth aspect, in which the viscosity of the ink composition falls within the range of 8 to 20 mPa·s.

A tenth aspect of the invention provides a textile printing method of a cellulosic textile, the method including the steps of: applying the ink composition according to the first aspect to a cellulosic textile using an ink jet printer; allowing the dye in the ink composition applied in the above step to react and fix on the cellulosic textile by heat; and washing away unfixed dye remaining in the cellulosic textile.

An eleventh aspect of the invention provides the textile printing method of a cellulosic textile according to the tenth aspect, further including the step of pretreating the textile by immersing before applying the ink composition the cellulosic textile in an aqueous solution containing at least one of a sizing material, an alkaline substance, and a hydrotropic agent.

Effects of the Invention

According to the present invention, an ink composition that is superior in discharge stability in printers equipped with an ink jet head for industrial use that requires a highly viscous ink and is also superior in storage stability and fixation properties to a textile of the ink, and a textile printing method of a cellulosic textile, using the ink composition can be provided.

PREFERRED MODE FOR CARRYING OUT THE INVENTION

The ink composition of the present invention contains at least one reactive dye as a coloring matter, and also contains water and a compound represented by the above formula (1) and having an average molecular weight of 340 to 2,200.

Although the reactive dye used in the ink composition of the present invention is not particularly limited, it is preferably a dye in which a reactive group that reacts with a textile is a monochlorotriazinyl group, i.e., a monochlorotriazine based reactive dye. Specific examples of the reactive dye include, e.g.: yellow dyes such as C.I. Reactive Yellow 2, 3, 18, 81, 84, 85, 95, 99, and 102; orange dyes such as C.I. Reactive Orange 5, 9, 12, 13, 35, 45, and 99; brown dyes such as C.I. Reactive Brown 2, 8, 9, 17, and 33; red dyes such as C.I. Reactive Red 3, 3:1, 4, 13, 24, 29, 31, 33, 125, 151, 206, 218, and 226; violet dyes such as C.I. Reactive Violet 1, and 24; blue dyes such as C.I. Reactive Blue 2, 5, 10, 13, 14, 15, 15:1, 49, 63, 71, 72, 75, 162, and 176; green dyes such as C.I. Reactive Green 5, 8, and 19; black dyes such as C.I. Reactive Black 1, 8, 23, and 39; and the like. These may be used alone, or two or more of these may be used in combination.

In the reactive dye, a mixed dye may be also used as a black dye which includes a blue dye as a principal component blended with an orange dye and a red dye. Moreover, other reactive dye may be further blended in the black dye for the purpose of adjusting the color tone.

The reactive dye which may be used is a dye in the form of dry powders or blocks, wet cake or the like. There are commercially available reactive dyes having a variety of qualities such as powders for industrial dyeing, liquid products for textile printing, and dyes for use in ink jet textile printing, and their production method, purity and the like vary, respectively. The ink composition of the present invention is preferably prepared using a material including impurities as low as possible in order to minimize adverse effects on storage stability and accuracy of discharge from ink jet printers. In general, reaction dyes are often contaminated with inorganic salts such as sodium chloride during the synthesis of the dye. Additionally, water not purified particularly and the like may contain metal ions such as a calcium ion and magnesium ion; therefore, the metal ions and the like will be included in the ink composition also when prepared using such water or the like, although the amount of the contaminants may be slight. For the sake of simplicity, the aforementioned inorganic salts and metal ions altogether are referred to as "inorganic impurities" herein below. These inorganic impurities not only significantly deteriorate storage stability and solubility of the reactive dye in the ink and the like, but may be the cause of corrosion and abrasion of ink jet printer heads. In order to eliminate these inorganic impurities, it is desired that a well-known process such as an ultrafiltration process, a reverse osmosis process or an ion exchange process be utilized to eliminate the inorganic impurities included in the ink composition as much as possible. The amount of the inorganic impurities included in the total amount of the ink composition is generally no more than 1% by mass, preferably no more than 0.5% by mass, and more preferably no more than 0.1% by mass. Additionally, after eliminating the inorganic impurities, the dye concentration may be adjusted by dilution or concentration to a desired level to obtain an ink composition.

The content of the reactive dye is generally 0.5 to 35% by mass, and preferably 1 to 20% by mass relative to the total mass of the ink composition of the present invention.

The compound represented by the above formula (1) is a compound having an average molecular weight of 340 to 2,200, in which $X_1$, $X_2$, $X_3$, and $X_4$ each independently represent a hydrogen atom or a methyl group; and j, k, m and n each represent a numeral, the sum of which is no less than 4 and no greater than 40.

$X_1$ to $X_4$ may be the same or different, and these are preferably the same. Moreover, all the $X_1$ to $X_4$ represent more preferably a hydrogen atom or a methyl group, and particularly preferably a methyl group.

The compound represented by the formula (1) is a compound obtained by subjecting diglycerin to addition polymerization with propylene oxide or ethylene oxide, in which the numerals represented by k, j, m, and n are average values indicating the degree of addition polymerization.

When the compound represented by the formula (1) is a compound obtained by subjecting diglycerin to addition polymerization with propylene oxide, i.e., a compound represented by the formula (1) in which any one of $X_1$ to $X_4$ represents a methyl group, k, j, m, and n represent a numeral, the sum of which is about no less than 4 and no greater than 24. Although it is difficult to specify each numeral represented by k, j, m, and n, since these are average values, they are preferably approximately similar values. Specifically, any one of k, j, m, and n preferably falls within the range of about 1 to about 6. In this case, the compound represented by the above formula (1) has an average molecular weight of generally about 340 to about 2,200, preferably about 380 to about 2,000, and more preferably about 400 to about 1,600. When the compound represented by the above formula (1) is a compound obtained by subjecting diglycerin to addition polymerization with ethylene oxide, i.e. a compound represented by the formula (1) in which any one of $X_1$ to $X_4$ represents a hydrogen atom, k, j, m, and n represent a numeral, the sum of which is about no less than 6 and no greater than 40. Each numeral represented by k, j, m, and n is preferably an approximately similar value, as in the above case. Specifically, any one of k, j, m, and n may fall within the range of about 1.5 to about 10. In this case, the compound represented by the above formula (1) has an average molecular weight of generally about 390 to about 2,200, preferably about 430 to about 2,200, and more preferably about 450 to about 2,000.

The compound represented by the above formula (1) for use in the present invention is generally known as polyoxypropylene diglyceryl ether or polyoxyethylene diglyceryl ether, which may be commercially available. Specific examples of the compound include e.g., polyoxypropylene diglyceryl ethers such as trade names SC-P400 (a compound represented by the above formula (1) in which k+j+m+n=4, and having an average molecular weight of 400), SC-P750 (similarly, a compound in which k+j+m+n=9, and having an average molecular weight of 750), SC-P1000 (similarly, a compound in which k+j+m+n=14, and having an average molecular weight of 1,000), SC-P1200 (similarly, a compound in which k+j+m+n=18, and having an average molecular weight of 1,200), and SC-P1600 (similarly, a compound in which k+j+m+n=24, and having an average molecular weight of 1,600); and polyoxyethylene diglyceryl ethers such as SC-E450 (a compound represented by the above formula (1) in which k+j+m+n=6, and having an average molecular weight of 450), SC-E750 (similarly, a compound in which k+j+m+n=13, and having an average molecular weight of 750), SC-E1000 (similarly, a compound in which k+j+m+n=20, and having an average molecular weight of 1,000), SC-E1500 (similarly, a compound in which k+j+m+n=30, and having an average molecular weight of 1,500), and SC-E2000 (similarly, a compound in which k+j+m+n=40, and having an average molecular weight of 2,000), all manufactured by Sakamoto Yakuhin Kogyo Co., Ltd.; and the like.

Among these specific examples, those having an average molecular weight of about 340 to 2,200, and preferably 400 to 2,000 are desired. It is to be noted that the average molecular weight can be measured with GPC (gel permeation chromatography).

The compound represented by the above formula (1) is used for the purpose of adjusting the viscosity of the ink composition of the present invention. The compound does not react with the reactive dye contained as a coloring matter in the ink composition, but enables the ink composition of the present invention to have a viscosity adjusted to fall within the range of values suited for ink jet heads for industrial use that require discharge responsiveness at high speed, and the like.

The content of the compound represented by the above formula (1) is generally 5 to 50% by mass, preferably 10 to 40% by mass, and more preferably 15 to 30% by mass relative to the total mass of the ink composition of the present invention.

It is desired that the ink composition of the present invention has a viscosity at 25° C. as measured with an E type viscometer in the range of generally 3 to 20 mPa·s and preferably 8 to 20 mPa·s for the purpose of improving the discharge responsiveness when used in a printer equipped with an ink jet head for industrial use.

The surface tension of this ink composition preferably falls within the range of generally 20 to 40 mN/m as measured with a plating method. More specifically, taking into consideration the amount of discharge, response speed, flight characteristics of the ink droplets, characteristics of the ink jet head and the like of the printer used, the physical properties may be adjusted to appropriate values.

The ink composition of the present invention preferably contains a water soluble organic solvent. The water soluble organic solvent herein has an effect as a viscosity adjusting agent, which serves in adjusting the ink viscosity to be most appropriate for discharge from the ink jet head. In addition, the water soluble organic solvent is preferably selected from those having an effect as an anti-drying agent, serving to prevent the ink from solid generation by drying, and not deteriorating the solubility of the reactive dye contained. Moreover, it is desired that the water soluble organic solvent be selected also appropriately taking into consideration the unreactivity with reactive groups of the reactive dye that will react with the textile, and inability to promote degradation of the reactive groups.

As the water soluble organic solvent, those having a high wetting effect are preferred in order to prevent clogging at the nozzle, and the like.

As the water soluble organic solvent described above, polyhydric alcohols, pyrrolidones and the like may be exemplified in addition to the compound represented by the above formula (1). As the polyhydric alcohols, for example, C2 to C6 polyhydric alcohols having two to three alcoholic hydroxyl groups, poly C2 to C3 alkylene glycols having four or more repeating units and having a molecular weight of no higher than about 20,000, and preferably liquid polyalkylene glycols, etc., may be exemplified. Among these, C2 to C6 polyhydric alcohols having two to three alcoholic hydroxyl groups, and pyrrolidones are preferred.

Specific examples of the water soluble organic solvent include C2 to C6 polyhydric alcohols having two to three alcoholic hydroxyl groups such as glycerin, 1,3-pentanediol, 1,5-pentanediol, ethylene glycol and propylene glycol; di- or tri- C2 to C3 alkylene glycols such as diethylene glycol and triethylene glycol, propylene glycol; poly C2 to C3 alkylene glycols such as polyethylene col and polypropylene glycol; pyrrolidones such as 2-pyrrolidone, and N-methyl-2-pyrrolidone; and the like. Among these, propylene glycol and 2-pyrrolidone are particularly preferred.

The water soluble organic solvent may be used either alone or in combination, and is preferably used in combination.

When the water soluble organic solvent is included, the content is generally 1 to 50% by mass, preferably 3 to 40% by mass, and more preferably 5 to 20% by mass relative to the total mass of the ink composition of the present invention.

The ink composition of the present invention may further contain in addition to the aforementioned water soluble organic solvent, agents for preparing inks such as, for example, a surfactant, a pH adjusting agent, and a preservative fungicide. The content of these agents for preparing inks in total is generally about 0 to 10% by mass, and preferably 0.05 to 5% by mass relative to the total mass of the ink composition of the present invention.

The surface tension of the ink composition is preferably adjusted with any one of a variety of anionic surfactants, amphoteric surfactants, cationic surfactants, nonionic surfactants and the like.

Examples of the anionic surfactant include alkylsulfocarboxylic acid salts, α-olefinsulfonic acid salts, polyoxyethylene alkyl ether acetic acid salts, N-acylamino acids or salts thereof, N-acylmethyltaurine salts, alkylsulfuric acid salts, polyoxyalkyl ether sulfuric acid salts, alkylsulfuric acid salts, polyoxyethylene alkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly4-vinylpyridine derivatives, and the like.

Examples of the amphoteric surfactant include betaine lauryldimethylamino acetate, 2-alkyl-N-carboxymethyl-N-hydroxyethylimidazolinium betaine, betaine coconut oil fatty acid amidopropyldimethylamino acetate, polyoctylpolyaminoethylglycine, imidazoline derivatives, and the like.

Examples of the nonionic surfactant include: ether based surfactants such as polyoxyethylene nonylphenyl ether, polyoxyethylene octylphenyl ether, polyoxyethylene dodecyl phenyl ether, polyoxyethylene octylphenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2,4,7,9-tetramethyl-5-decyne-4,7-diol, 3,6-dimethyl-4-octyne-3,6-diol and 3,5-dimethyl-1-hexine-3-ol; and other specific examples include trade names Surfinol 104, 82, 440 and 465, Olfin STG manufactured by Nissin Chemical Co., Ltd.; and the like. The surfactant is preferably of Surfinol series, and more preferably Surfinol 440.

Examples of the pH adjusting agent include tris(hydroxymethyl)aminomethane; alkali hydroxides such as sodium hydroxide, potassium hydroxide, and lithium hydroxide; tertiary amines such as triethanolamine, diethanolamine, dimethylethanolamine, and diethyl ethanolamine; and the like. It is preferred that the ink composition of the present invention contains tris(hydroxymethyl)aminomethane, in particular. The content of the pH adjusting agent is generally 0.1 to 2% by mass, and preferably 0.3 to 1.5% by mass relative to the total mass of the ink composition of the present invention.

Examples of the preservative fungicide include sodium dehydroacetate, sodium benzoate, sodium pyridinethione-1-oxide, zinc pyridinethione-1-oxide, 1,2-benzisothiazoline-3-one, 1-benzisothiazoline-3-one amine salts, Proxel GXL manufactured by Avecia, Inc., and the like, and Proxel GXL is preferred.

The ink composition of the present invention may be prepared by mixing the aforementioned components with water as needed, and stirring until the solid contents such as the reactive dye are dissolved. Accordingly, the remainder other than the aforementioned components may be water.

In the textile printing method of the present invention, the ink composition of the present invention, preferably an ink prepared by filtering the ink composition through a membrane filter or the like to eliminate the contaminants, is used to execute the textile printing on a fabric. The ink nozzle and the like used in this method are not particularly limited, and may be selected appropriately in accordance with the purpose. The fabric is preferably constituted predominantly with a cellulosic fiber, for example, a natural fiber such as cotton or hemp, a regenerated cellulose fiber such as rayon, a blend of these fibers, or the like.

As a method of the textile printing of a fabric using the ink composition of the present invention, for example, a method in which three steps of: subjecting the fabric to a pretreatment for preventing bleeding etc.; allowing the dye in the ink composition applied to the fabric using an ink jet printer to react and fix; and washing the unfixed die remaining in the fabric are carried out sequentially, and the like may be exemplified.

In the step of subjecting the fabric to a pretreatment, an aqueous solution of a pretreatment agent including a sizing agent, an alkaline substance, an anti-reducing agent and a hydrotropic agent may be preferably used as a pretreatment liquid for application to the fabric.

Examples of the sizing agent include natural gums such as guar and locust bean; starches; sodium alginate; seaweeds such as and funori (glue plant); plant skin/sheath components such as pectic acid; cellulose derivatives such as methyl cellulose, ethyl cellulose, hydroxyethyl cellulose and carboxymethyl cellulose; processed starches such as carboxymethyl starch; synthetic sizes such as polyvinyl alcohol and polyacrylic esters; and the like. The sizing agent is preferably sodium alginate.

Examples of the alkaline substance include alkali metal salts of an inorganic acid or organic acid; salts of an alkaline earth metal; and compounds that release an alkali when heated. In particular, alkali metal hydroxides and alkali metal salts of an inorganic acid or organic acid are suited. The alkaline substance is preferably a sodium compound or a potassium compound. Examples of such a compound include sodium hydroxide, calcium hydroxide, sodium carbonate, sodium bicarbonate, potassium carbonate, sodium formate, sodium dihydrogen phosphate, disodium hydrogen phosphate, sodium trichloroacetate, sodium phosphate, and the like. The alkaline substance is particularly preferably sodium bicarbonate.

The anti-reducing agent is preferably sodium meta-nitrobenzene sulfonate.

Examples of the hydrotropic agent include urea and alkylurea such as dimethylurea, and urea is preferred.

The pretreatment agents as described above may be used either alone or in combination, and use in combination is preferred.

Exemplary mixing ratio of the pretreatment agents relative to the total mass of the pretreatment liquid is, for example, 0.5 to 5% by mass of the sizing agent, 0.5 to 5% by mass of sodium bicarbonate, 0 to 5% by mass of sodium meta-nitrobenzene sulfonate, 1 to 20% by mass of urea, and water for the balance.

The application method of the pretreatment agent to the fabric is exemplified by a padding method. The drawing rate in the padding is preferably about 40 to 90%, and more preferably about 60 to 80%.

In the step of allowing the dye to react and fix, it is preferred that, for example, after applying the ink composition to the pretreated fabric, the fabric is preliminarily dried by allowing to stand at room temperature to 150° C. for 0.5 to 30 min, and thereafter the fabric is subjected to a steaming treatment. The steaming treatment is preferably carried out by allowing to stand under conditions of a humidity of 80 to 100% and a temperature of 95 to 105° C. for 5 to 40 min.

Additionally, in the step of washing away the unfixed dye, washing with warm water is preferred. The warm water may contain a surfactant.

Thereafter, the fabric is dried at 50 to 120° C. for 5 to 30 min to obtain a printed textile.

EXAMPLES

Hereinafter, the present invention is explained in more detail by way of Examples, but the present invention is not limited to these Examples. In Examples, unless otherwise stated in particular, the term "part" means "part by mass", and "%" means "% by mass", respectively.

As the compound represented by the above formula (1) in the present invention, commercially marketed products of the following two series which are all available from Sakamoto Yakuhin Kogyo Co., Ltd. were used. Of these, any compound of "SC-P" series is polyoxypropylene diglyceryl ether, whereas any compound of "SC-E" series is polyoxyethylene diglyceryl ether.

Trade Names
1) SC-P400: average molecular weight of 400
2) SC-P1000: average molecular weight of 1,000
3) SC-P1200: average molecular weight of 1,200
4) SC-P1600: average molecular weight of 1,600
5) SC-E450: average molecular weight of 450
6) SC-E1000: average molecular weight of 1,000
7) SC-E1500: average molecular weight of 1,500
8) SC-E2000: average molecular weight of 2,000

Examples 1 to 8

After each ink composition was obtained by mixing the components as described in each Example below and stirring the mixture for about 1 hour until the solid contents were dissolved, thus resulting solution was filtered through a 0.45 μm membrane filter (trade name, Cellulose Acetate Filter Paper, manufactured by Advantec Toyo Kaisha, Ltd.,) to prepare an ink of each Example.

Example 1

Yellow Ink

C.I. Reactive Yellow 2: 10 parts
(manufactured by Nippon Kayaku Co., Ltd., monochlorotriazine based reactive dye)
Tris(hydroxymethyl)aminomethane: 0.5 parts
SC-P400: 25 parts
propylene glycol: 10 parts
2-Pyrrolidone: 3 parts
Surfinol 440: 0.1 parts
Proxel GXL: 0.1 parts
Ion exchanged water: 51.3 parts

Example 2

Magenta Ink

C.I. Reactive Red 31: 10 parts
(manufactured by Nippon Kayaku Co., Ltd., monochlorotriazine based reactive dye)
Tris(hydroxymethyl)aminomethane: 0.5 parts
SC-P1000: 25 parts
Propylene glycol: 10 parts
2-Pyrrolidone: 3 parts
Surfinol 440: 0.1 parts
Proxel GXL: 0.1 parts
Ion exchanged water: 51.3 parts

Example 3

Cyan Ink

C.I. Reactive Blue 15:1: 10 parts
(manufactured by Nippon Kayaku Co., Ltd., monochlorotriazine based reactive dye)
Tris(hydroxymethyl)aminomethane: 0.5 parts
SC-P1200: 25 parts
Propylene glycol: 10 parts
2-Pyrrolidone: 3 parts
Surfinol 440: 0.1 parts
Proxel GXL: 0.1 parts
Ion exchanged water: 51.3 parts

Example 4

Black Ink

C.I. Reactive Orange 12: 2.5 parts
(manufactured by Nippon Kayaku Co., Ltd., monochlorotriazine based reactive dye)
C.I. Reactive Red 3:1: 2.5 parts
(manufactured by Nippon Kayaku Co., Ltd., monochlorotriazine based reactive dye)
C.I. Reactive Blue 176: 5.0 parts
(manufactured by Nippon Kayaku Co., Ltd., monochlorotriazine based reactive dye)
Tris(hydroxymethyl)aminomethane: 0.5 parts
SC-P1600: 25 parts
Propylene glycol: 10 parts
2-Pyrrolidone: 3 parts
Surfinol 440: 0.1 parts
Proxel GXL: 0.1 parts
Ion exchanged water: 51.3 parts

Example 5

Yellow Ink

C.I. Reactive Yellow 2: 10 parts
(manufactured by Nippon Kayaku Co., Ltd., monochlorotriazine based reactive dye)
Tris(hydroxymethyl)aminomethane: 0.5 parts
SC-E450: 25 parts
Propylene glycol: 10 parts
2-Pyrrolidone: 3 parts
Surfinol 440: 0.1 parts
Proxel GXL: 0.1 parts
Ion exchanged water: 51.3 parts

Example 6

Magenta Ink

C.I. Reactive Red 31: 10 parts
(manufactured by Nippon Kayaku Co., Ltd., monochlorotriazine based reactive dye)
Tris(hydroxymethyl)aminomethane: 0.5 parts
SC-E1500: 25 parts Propylene glycol: 10 parts
2-Pyrrolidone: 3 parts
Surfinol 440: 0.1 parts
Proxel GXL: 0.1 parts
Ion exchanged water: 51.3 parts Example 7

Cyan Ink

C.I. Reactive Blue 15:1: 10 parts
(manufactured by Nippon Kayaku Co., Ltd., monochloro-triazine based reactive dye)
Tris(hydroxymethyl)aminomethane: 0.5 parts
SC-E2000: 25 parts
Propylene glycol: 10 parts
2-Pyrrolidone: 3 parts
Surfinol 440: 0.1 parts
Proxel GXL: 0.1 parts
Ion exchanged water: 51.3 parts Example 8

Black Ink

C.I. Reactive Orange 12: 2.5 parts
(manufactured by Nippon Kayaku Co., Ltd., monochloro-triazine based reactive dye)
C.I. Reactive Red 3:1: 2.5 parts
(manufactured by Nippon Kayaku Co., Ltd., monochloro-triazine based reactive dye)
C.I. Reactive Blue 176: 5.0 parts
(manufactured by Nippon Kayaku Co., Ltd., monochloro-triazine based reactive dye)
Tris(hydroxymethyl)aminomethane: 0.5 parts
SC-E1000: 25 parts
Propylene glycol: 10 parts
2-Pyrrolidone: 3 parts
Surfinol 440: 0.1 parts
Proxel GXL: 0.1 parts
Ion exchanged water: 51.3 parts Comparative Examples 1 to 4

Inks for comparison of Comparative Examples 1, 2, and 4 were prepared similarly to Example 2 except that the compound shown below was used in place of the compound represented by the above formula (1). It is to be noted that since the ink composition itself gelated in Comparative Example 3, filtration with a membrane filter could not be carried out, whereby the preparation of the ink failed.
Comparative Example 1: Glycerin
Comparative Example 2: Polyglycerin 750 (polyglycerin having an average molecular weight of 750, manufactured by Sakamoto Yakuhin Kogyo Co., Ltd.)
Comparative Example 3: Polypropylene glycol 400
Comparative Example 4: Propylene Glycol
Comparative Example 5: Magenta Ink
In an attempt to obtain an ink composition similarly to each Example except that the following components were mixed, the dye did not dissolve when preparing this composition, whereby the preparation of the ink composition failed.
C.I. Reactive Red 31: 10 parts
(manufactured by Nippon Kayaku Co., Ltd., monochloro-triazine based reactive dye)
Tris(hydroxymethyl)aminomethane: 0.5 parts
Propylene glycol: 70 parts
2-Pyrrolidone: 3 parts
Surfinol 440: 0.1 parts
Proxel GXL: 0.1 parts
Ion exchanged water: 16.3 parts Comparative Examples 6 to 9

Inks for comparison of Comparative Examples 6, 7, and 9 were prepared similarly to Example 8 except that the compound shown below was used in place of the compound represented by the above formula (1). It is to be noted that since the ink composition itself gelated in Comparative Example 8, filtration with a membrane filter could not be carried out, whereby the preparation of the ink failed.
Comparative Example 6: Glycerin
Comparative Example 7: Polyglycerin 750 (polyglycerin having an average molecular weight of 750, manufactured by Sakamoto Yakuhin Kogyo Co., Ltd.)
Comparative Example 8: Polypropylene glycol 400
Comparative Example 9: Propylene Glycol
Comparative Example 10: Black Ink
In an attempt to obtain an ink composition similarly to each Example except that the following components were mixed, the dye did not dissolve when preparing this composition, whereby the preparation of the ink composition failed.
C.I. Reactive Orange 12: 2.5 parts
(manufactured by Nippon Kayaku Co., Ltd., monochloro-triazine based reactive dye)
C.I. Reactive Red 3:1: 2.5 parts
(manufactured by Nippon Kayaku Co., Ltd., monochloro-triazine based reactive dye)
C.I. Reactive Blue 176: 5.0 parts
(manufactured by Nippon Kayaku Co., Ltd., monochloro-triazine based reactive dye)
Tris(hydroxymethyl)aminomethane: 0.5 parts
Propylene glycol: 70 parts
2-Pyrrolidone: 3 parts
Surfinol 440: 0.1 parts
Proxel GXL: 0.1 parts
Ion exchanged water: 16.3 parts
With respect to the inks of Examples 1 to 8, and Comparative Examples 1, 2, 4, 6, 7, and 9 obtained as described above, or Printed Fabrics prepared as in the following using these inks, evaluations were made as described below. Since the preparation of the inks of Comparative Examples 3, 5, 8, and 10 failed as described above, preparation of the Printed Fabrics and evaluations were not performed.
Preparation of Test Print Fabric
When a fabric was subjected to textile printing using an ink jet printer under the identical conditions, failure in favorable printing was observed in the case in which the ink of some of Comparative Examples was used as shown in the results of the discharge efficiency test in Table 1 below, for the reasons that the ink of each Example and Comparative Example had each varying viscosity etc. Thus, in order to prepare uniformly printed test print fabrics, preparation of the Printed Fabrics was carried out as in the following. More specifically, a color paste having the following composition was prepared using the ink of the present invention prepared in Example 1, and a solid pattern of the following color paste was printed on a cotton fabric using an Automatic Screen Printing Machine (Model RSP-510VM, manufactured by TSUJII DYEING MACHINE MANUFACTURING CO., LTD.). After the fabric was subjected to intermediate drying at 60 to 80° C., a steaming treatment was carried out at 100 to 103° C. for 10 min. After washing with water, the fabric was washed with boiling water at 95 to 100° C. for 10 min, followed by washing with water and drying to obtain a test print fabric. This test print fabric was referred to as "Printed Fabric 1".

Ink of Example 1: 10 parts
5% aqueous sodium alginate solution: 50 parts
Urea: 5 parts Sodium bicarbonate: 2 parts
Ion exchanged water: 33 parts Each test print fabric was obtained with the color paste containing the ink of each Example or Comparative Example in a similar manner to Example 1 except that the ink of any one of Examples 2 to 8, or the ink of Comparative Example 1, 2, 4, 6, 7, or 9 was used in place of the ink of Example 1. These are referred to as "Printed Fabrics 2 to 8" and "Comparative Printed Fabrics 1, 2, 4, 6, 7, and 9", respectively.

Preparation of Standard Printed Fabric

A Standard Printed Fabric was prepared in a similar manner to the preparation of the Printed Fabric 1 except that an aqueous solution having a 10% dye content prepared by dissolving the same amount of the dye identical to that in Example 1 in ion exchanged water was used in place of the ink prepared in Example 1. This Standard Printed Fabric is referred to as "Standard Printed Fabric 1".

In a similar manner to the preparation of the Standard Printed Fabric 1, "Standard Printed Fabrics 2 to 8", and "Comparative Standard Printed Fabrics 1, 2, 4, 6, 7, and 9" were prepared respectively, except that the same amount of the dye identical to that in any one of Examples 2 to 8, or Comparative Examples 1, 2, 4, 6, 7, or 9 was used in place of the same amount of the dye identical to that in Example 1.

Evaluation of Each Ink and Each Printed Fabric (1) Fixation Ratio

The dye fixation ratio was evaluated on each test print fabric obtained as described above. The fixation ratio was determined by colorimetric measurement of a Macbeth reflected density on the test print fabric and the Standard Printed Fabric using a colorimetric photometer manufactured by GRETAG-MACBETH AG, trade name SpectroEye, and thereafter calculating each fixation ratio in accordance with the following formula.

Fixation ratio=$(A/B) \times 100 (\%)$

A: Reflected density of each Printed Fabric or each Comparative Printed Fabric.

B: Reflected density of each Standard Printed Fabric or each Comparative Standard Printed Fabric.

The test results of the fixation ratio were evaluated according to the following criteria.

A: no less than 95%
B: no less than 90% and less than 95%
C: less than 90%

The results are shown in Table 1.

It should be noted that the fixation ratio of a dye has been known to be affected by types of components other than the dye and water contained in the ink, i.e., a water soluble organic solvent, etc., and thus may be altered. Therefore, upon evaluation of the fixation ratio, the aqueous solution of each dye not containing other component was used for each Standard Printed Fabric and each Comparative Standard Printed Fabric in order to avoid altering the fixation ratio owing to an influence from the other component. In general, a reflected density of a fabric printed using an aqueous dye solution exhibits the maximum value (suggesting the highest concentration) as compared with those printed using inks further containing other component(s). In addition, the dye concentration in the aqueous dye solution was adjusted to 10% so as to give an identical dye concentration to the ink of each corresponding Example or each corresponding Comparative Example.

(2) Viscosity

The viscosity of each ink of Examples 1 to 8, and Comparative Examples 1, 2, 4, 6, 7, and 9 was measured using an E type viscometer at 25° C. The results are shown in Table 2. The values in this Table are represented by units of mPa·s.

(3) Discharge Efficiency

A cotton fabric which had been subjected to a pretreatment using an aqueous solution containing sodium alginate, urea, sodium bicarbonate etc., by a padding method was printed using each ink of Examples 1 to 8, and Comparative Examples 1, 2, 4, 6, 7, and 9 with an on-demand ink jet printer (Apollo II printer system, manufactured by FUJIFILM Dimatix, Inc.,) equipped with ink jet heads for industrial use (NOVA, manufactured by FUJIFILM Dimatix, Inc.,). Then, the discharge efficiency of each ink was evaluated. The discharge efficiency was evaluated according to the criteria below based on the state of a printed image obtained by carrying out continuous printing of a basic pattern which is printable by the aforementioned printer with its initial setting, in the length of 2 m on a cotton fabric roll having a width of 7.5 cm, using an ITI Web Transport (cloth feeding machine for ink jet printing, manufactured by ITI Corporation).

A: printable favorably to the end.

B: printable to the end, but slight scattering and defective line observable in the print image.

C: significant scattering and defective line observed in the print image.

The test results are shown in Table 2.

(4) Storage Stability

The storage stability of each ink of Examples 1 to 8, and Comparative Examples 1, 2, 4, 6, 7, and 9 was evaluated. The storage stability was evaluated by stirring the ink at ordinary temperature for 1 hour, and observing the presence/absence of precipitation of the dye, and the state of the ink after one week. The test results were evaluated according to the following criteria.

A: precipitation of the dye, and gelation of the ink not found.

B: precipitation of the dye slightly found, but gelation of the ink not found.

C: precipitation of the dye significantly found, or gelation of the ink found.

The test results are shown in Table 2.

TABLE 1

|  | Fixation Ratio |
|---|---|
| Printed Fabric 1 | A |
| Printed Fabric 2 | A |
| Printed Fabric 3 | A |
| Printed Fabric 4 | A |
| Printed Fabric 5 | A |
| Printed Fabric 6 | A |
| Printed Fabric 7 | A |
| Printed Fabric 8 | A |
| Comparative Printed Fabrics 1 | C |
| Comparative Printed Fabrics 2 | C |
| Comparative Printed Fabrics 4 | A |
| Comparative Printed Fabrics 6 | C |
| Comparative Printed Fabrics 7 | C |
| Comparative Printed Fabrics 9 | A |

TABLE 2

|  | Viscosity | Discharge Efficiency | Storage Stability |
|---|---|---|---|
| Example 1 | 9.5 | A | A |
| Example 2 | 14.2 | A | A |
| Example 3 | 13.6 | A | A |
| Example 4 | 15.1 | A | A |
| Example 5 | 8.3 | A | A |
| Example 6 | 13.6 | A | A |
| Example 7 | 16.3 | A | A |
| Example 8 | 13.5 | A | A |
| Comparative Example 1 | 5.4 | C | A |
| Comparative Example 2 | 7.9 | B | A |
| Comparative Example 4 | 5.6 | C | A |
| Comparative Example 6 | 6.1 | C | A |
| Comparative Example 7 | 9.0 | B | A |
| Comparative Example 9 | 6.1 | C | A |

As is clear from the results shown in Table 1, any of each Printed Fabric prepared from the ink composition of the present invention exhibited a favorable fixation ratio, whereas Comparative Printed Fabrics 1, 2, 6, and 7 were significantly inferior in terms of the fixation ratio.

In addition, it was proven that the viscosity of the ink of each Example and Comparative Example fell within the range of 3 to 20 mPa·s which is applicable in ink jet heads for industrial use. However, the discharge efficiency of Comparative Examples 1, 4, 6, and 9 was significantly inferior to others, and these inks had a viscosity of 5.4 to 6.1 mPa·s. To the contrary, the ink of each Example had a viscosity of 8.3 to 16.3 mPa·s, revealing that the range of about 8 to 20 mPa·s of the viscosity of the ink achieves still more favorable results than the range of 3 to 20 mPa·s, as the viscosity range of the ink suited for ink jet heads for industrial use.

It is difficult to adjust the ink of each Comparative Example in which a compound conventionally known as a viscosity adjusting agent is used such that it can be suited for ink jet heads for industrial use. For example, although any of Comparative Examples 4, 5, 9, and 10 demonstrates an example of when propylene glycol was used, Comparative Examples 4 and 9 in which the blend proportion was comparative to the compound represented by the above formula (1) of the present invention exhibited somewhat insufficient viscosity. On the other hand, Comparative Examples 5 and 10 in which the blend proportion was elevated for the purpose of increasing the viscosity resulted in failure in preparing the ink itself.

Additionally, Comparative Examples 2 and 7 in which polyglycerin 750 was used similarly exhibited a comparatively favorable value of the viscosity; however, the fixation ratio of the dye was significantly inferior.

It was noted that except for Comparative Examples in which the preparation of the ink failed, any of the ink of each Comparative Example and each Example which could be successfully prepared exhibited satisfactory storage stability. From the foregoing results, it is concluded that the ink composition of the present invention is suited for ink jet head for industrial use as it is superior in any of discharge stability, fixation property of the dye, and storage stability.

INDUSTRIAL APPLICABILITY

The ink composition of the present invention can be suitably used as an ink for ink jet textile printing, and particularly for ink jet textile printing carried out using an ink jet head for industrial use.

The invention clamed is:

1. An ink composition comprising: at least one reactive, monochlorotriazine-based dye as a coloring matter; water; and a compound represented by the following formula (1), having an average molecular weight of 340 to 2,200,

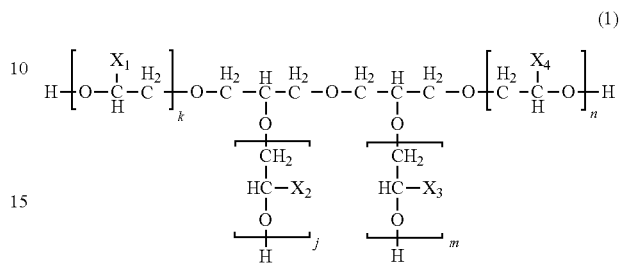

wherein, $X_1$, $X_2$, $X_3$, and $X_4$ each independently represent a hydrogen atom or a methyl group; and j, k, m and n each represent a numeral, the sum of which is no less than 4 and no greater than 40.

2. The ink composition according to claim 1, wherein $X_1$, $X_2$, $X_3$, and $X_4$ in the above formula (1) all represent a hydrogen atom or a methyl group.

3. The ink composition according to claim 1, wherein $X_1$, $X_2$, $X_3$, and $X_4$ in the above formula (1) all represent a methyl group.

4. The ink composition according to claim 1, further comprising a water soluble organic solvent.

5. The ink composition according to claim 1, further comprising a pH adjusting agent in an amount of 0.1 to 2% by mass relative to the total mass of the ink composition.

6. The ink composition according to claim 5, wherein the pH adjusting agent is tris(hydroxymethyl)aminomethane.

7. The ink composition according to claim 1, wherein the viscosity of the ink composition at 25° C. falls within the range of 3 to 20 mPa·s.

8. The ink composition according to claim 7, wherein the viscosity of the ink composition falls within the range of 8 to 20 mPa·s.

9. A textile printing method of a cellulosic textile, comprising:

applying the ink composition according to claim 1 to a cellulosic textile using an ink jet printer;

allowing the dye in the ink composition applied to react and fix on the cellulosic textile by heat; and washing away unfixed dye remaining in the cellulosic textile.

10. The textile printing method of a cellulosic textile according to claim 9, further comprising pretreating the textile by immersing before applying the ink composition to the cellulosic textile in an aqueous solution comprising at least one selected from the group consisting of a sizing material, an alkaline substance, and a hydrotropic agent.

* * * * *